US012647789B2

(12) United States Patent (10) Patent No.: US 12,647,789 B2
Deixler et al. (45) Date of Patent: Jun. 2, 2026

(54) CONFIGURING WIRELESS NETWORK USING EPHEMERAL GATEWAY

(71) Applicant: SIGNIFY HOLDING B.V., Eindhoven (NL)

(72) Inventors: Peter Deixler, Arlington, MA (US); Leendert Teunis Rozendaal, Valkenswaard (NL); Bozena Erdmann, Aachen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 372 days.

(21) Appl. No.: 18/017,117

(22) PCT Filed: Jul. 6, 2021

(86) PCT No.: PCT/EP2021/068601
§ 371 (c)(1),
(2) Date: Jan. 20, 2023

(87) PCT Pub. No.: WO2022/017770
PCT Pub. Date: Jan. 27, 2022

(65) Prior Publication Data
US 2023/0232231 A1 Jul. 20, 2023

Related U.S. Application Data

(60) Provisional application No. 63/054,423, filed on Jul. 21, 2020.

(30) Foreign Application Priority Data

Jul. 28, 2020 (EP) ..................................... 20188189

(51) Int. Cl.
*H04W 12/084* (2021.01)
*H04W 4/80* (2018.01)
*H04W 88/16* (2009.01)

(52) U.S. Cl.
CPC ........... *H04W 12/084* (2021.01); *H04W 4/80* (2018.02); *H04W 88/16* (2013.01)

(58) Field of Classification Search
None
See application file for complete search history.

(56) References Cited

U.S. PATENT DOCUMENTS

2017/0094494 A1 3/2017 Douglas et al.
2019/0028886 A1 1/2019 Deixler et al.
(Continued)

FOREIGN PATENT DOCUMENTS

GB 2444304 A 6/2008
WO 2019048278 A1 3/2019
WO 2019170462 A1 9/2019

OTHER PUBLICATIONS

Bian Jiali, et al., "The New Intelligent Home Control System Based on the Dynamic and Intelligent Gateway," Proceedings of IEEE IC-BNMT 2011 (5 Pages).

*Primary Examiner* — Frantz Bataille

(57) ABSTRACT

The present invention relates to providing a mobile ephemeral gateway (12). The ephemeral gateway (12) is configured for configuring wireless network devices (40, 42, 44) of a wireless network (200) in its proximity, for acting as a gateway of the wireless network, and for making available for at least one other gateway (30) configuration information of the wireless network obtained during configuring the wireless network devices (40, 42, 44). The mobile ephemeral gateway (12) can be replaced or augmented by the at least one other gateway (30). The wireless network (200) can be controlled based on the configuration information made available by the ephemeral gateway (12). This may allow a more reliable and faster configuration of wireless networks with reduced data traffic during configuration as well as an improved operation of the wireless network as (Continued)

multiple GWs (12, 30) may perform functions in the wireless network sequentially or in parallel.

12 Claims, 5 Drawing Sheets

(56) References Cited

U.S. PATENT DOCUMENTS

| | | | | |
|---|---|---|---|---|
| 2019/0268763 A1* | 8/2019 | Alfred | ................... | H04L 63/061 |
| 2020/0008056 A1* | 1/2020 | Wu | ................... | H04W 12/0431 |
| 2022/0345982 A1 | 10/2022 | Rozendaal et al. | | |

* cited by examiner

500

CONFIGURING WIRELESS NETWORK USING EPHEMERAL GATEWAY

CROSS-REFERENCE TO PRIOR APPLICATIONS

This application is the U.S. National Phase application under 35 U.S.C. § 371 of International Application No. PCT/EP2021/068601, filed on Jul. 6, 2021, which claims the benefit of U.S. Provisional Patent Application No. 63/054,423, filed on Jul. 21, 2020 and European Patent Application No. 2018819.3, filed on Jul. 28, 2020. These applications are hereby incorporated by reference herein.

FIELD OF THE INVENTION

The present invention relates to a mobile configuration device, a configuration system, a method for configuring a set of wireless network devices and at least one other gateway (GW) using a mobile configuration device, a computer program product for configuring wireless network devices and at least one other GW of a wireless network using a mobile configuration device, and a respective computer readable medium storing the computer program product.

BACKGROUND OF THE INVENTION

US 2019/0028886 A1 shows a configuration system arranged to configure a first set of wireless network devices to form a first stand-alone wireless network. The system comprises a portable configuration device, a configuration information storage, and a configuration manager. The portable configuration device is arranged to connect to the configuration manager and transmit a configuration request for the first set of wireless network devices and wirelessly connect with the first set of wireless network devices for configuring the first set of wireless network devices to form a first stand-alone wireless network. The configuration information storage is arranged to store configuration parameters of further sets of wireless network devices previously configured to form further stand-alone wireless networks. The configuration manager is arranged to receive the configuration request for the first set of wireless network devices from the portable configuration device, to determine in the further sets of wireless network devices a second set of wireless network devices spatially located so that it may be merged with the first set of wireless network devices into a single wireless network in the future, and to determine first configuration parameters for the first set of wireless network devices for forming the first set into a first stand-alone wireless network, the first and second configuration parameters being compatible with the future single wireless network.

WO 2019/170462A1 discloses methods for controlling commissioning and/or control of a combo network device with dual connectivity in a wireless network by using a smart device. In a factory new state, the combo network device has not yet joined any wireless network by its first connectivity (e.g., Zigbee) and thus broadcasts a beacon with beacon information to solicit a connection from the smart device by its second connectivity (e.g. BLE). If the combo network device joins a wireless network, it enters an associated state in which the beacon information will now contain an identification of the wireless network.

SUMMARY OF THE INVENTION

It can be seen as an object of the present invention to provide a mobile configuration device, a configuration system, a method for configuring a set of wireless network devices and at least one other GW using a mobile configuration device, a computer program product for configuring wireless network devices and at least one other GW of a wireless network using a mobile configuration device, and a respective computer readable medium storing the computer program product which allow configuring wireless network devices and at least one other GW of a wireless network faster.

In a first aspect of the present invention a mobile configuration device is presented. The mobile configuration device is configured for providing an ephemeral GW located at a current position of the mobile configuration device. The ephemeral GW is configured for configuring wireless network devices of a wireless network in proximity of the mobile configuration device, for acting as a GW of the wireless network, and for making available for at least one other GW configuration information of the wireless network obtained during configuring the wireless network devices.

Since the ephemeral GW is configured for configuring wireless network devices in the proximity of the mobile configuration device, a configuration order can be freely selected and a configuration can be performed faster. Compared to configuring the wireless network devices of the wireless network by starting with an immobile GW, such as an immobile permanent GW, the ephemeral GW allows to configure wireless network devices which are in proximity to the mobile configuration device. In contrast, if the wireless network devices of the wireless network are configured by an immobile permanent GW, the permanent GW and its surrounding wireless network devices need to be configured first in order to allow communication between a wireless network device farther away from the permanent GW to be configured by the permanent GW. The ephemeral GW is mobile, such that the ephemeral GW can be moved into proximity of each wireless network device. Since configuration information is generated by the ephemeral GW during configuring the wireless network devices and as the configuration information is made available for the at least one other GW, no reconfiguration is required when the ephemeral GW is replaced or augmented by the at least one other GW. Using the ephemeral GW may allow to perform the configuration in the same communication channels used for controlling the wireless network devices. This may furthermore allow validating more configuration aspects while the ephemeral GW is in proximity to the wireless network devices that are currently configured by the ephemeral GW. Using the ephemeral GW may reduce data traffic and increase security for configuring the wireless network devices as the ephemeral GW can be located in the proximity of the wireless network devices to be configured, i.e., no multiple hops between intermediate wireless network devices are required. Furthermore, using the ephemeral GW may allow better control over a network topology for the wireless network in form of large mesh networks.

The ephemeral GW can for example be specific hardware included in the mobile configuration device or it can be provided by a computer program running on and using hardware of the mobile configuration device.

The mobile configuration device, e.g., by the ephemeral GW, can be configured for controlling the wireless network based on the configuration information made available by the ephemeral GW. The wireless network can also be controlled by the at least one other GW.

The at least one other GW can be a permanent GW. The permanent GW can be configured for controlling the wireless network once the ephemeral GW has left the wireless network. The permanent GW can also be configured for augmenting the ephemeral GW when both GWs are included in the wireless network with the wireless network devices. The at least one other GW can also be another ephemeral GW, e.g., another ephemeral GW provided on another mobile configuration device.

The mobile configuration device can comprise a data storage that can be used by or be included in the ephemeral GW for storing the configuration information.

The mobile configuration device can comprise a processor that can be used by or be included in the ephemeral GW for processing data, such as the configuration information.

The mobile configuration device can comprise a transceiver that can be used by or be included in the ephemeral GW for making available the configuration information to the at least one other GW.

The ephemeral GW can be configured for making available the configuration information of the wireless network for the at least one other GW, for instance, by transmitting the configuration information directly to the at least one other GW or by transmitting the configuration information to an intermediate location, such as a cloud server. The cloud server can transmit the configuration information to the at least one other GW. The cloud server may, for instance, store the configuration information and transmit it to the at least one other GW upon request.

The configuration information can include network parameters including network identifiers, network security credentials, grouping information, and/or network channels. The network parameters can for example include Trust Center Link Keys (TCLKs) of the wireless network devices, hashes of TCLKs, IEEE address of the permanent GW, IEEE addresses of the wireless network devices, a network key, a personal area network identifier (PAN ID), an extended PAN ID (EPID), a short address of the trust center (TC), a specific network channel, a network update ID (nwkUpdateID), group identifiers (group IDs) of the wireless network devices, and group memberships of the wireless network devices.

The ephemeral GW can be configured for performing application level configuration actions. The mobile configuration device can be configured for performing one or more functions, such as all functions of the at least one other GW.

The mobile configuration device can be in proximity of the wireless network devices temporarily for configuring the wireless network devices and/or for controlling the wireless network devices. The ephemeral GW provided by the mobile configuration device can be configured for controlling the wireless network devices, e.g., while the mobile configuration device is in proximity to the wireless network devices. The ephemeral GW can be included in the wireless network in parallel to the at least one permanent GW.

The ephemeral GW can be configured for providing a list of the configured wireless network devices. The list of the configured network devices can be included in the configuration information.

Configuring the wireless network devices can, for instance, include the steps:

upgrading software on the wireless network devices, validating correct operating of the wireless network devices, validating correct positioning of the wireless network devices, validating correct installation of the wireless network devices, joining of the wireless network devices into the wireless network, grouping the wireless network devices into groups, optimizing the wireless network, providing network parameters to the wireless network devices, setting configuration parameters of the wireless network devices, establishing security credentials, establishing network configuration, establishing application configuration, validating security credentials, validating network configuration, validating application configuration provisioning controls behavior of the wireless network devices in the wireless network, validating the controls behavior of the wireless network devices in the wireless network, determining status information of the wireless network devices.

Upgrading software on the wireless network devices can include performing an over-the-air update (OTAU). The ephemeral GW can cause one or more of the wireless network devices to act as an OTAU server that is provided with the update and that distributes it to the other wireless network devices of the wireless network while the ephemeral GW configures them or after the ephemeral GW configured them. Alternatively, the update may also be broadcasted by the ephemeral GW or the OTAU server.

The wireless network devices may be battery operated devices. In this case, a "commissioning in the box" approach may be used in which the ephemeral GW may perform an OTAU while the wireless network devices are in their box waiting to be installed.

Validating correct operating of the wireless network devices can for example include checking whether the wireless network devices operate as expected when activated.

Validating correct positioning of the wireless network devices can for example include checking whether the wireless network devices are positioned at the correct position as indicated by the configuration information, such as a position on a floor plan.

Validating correct installation can for example include checking whether powering of the wireless network devices is performed correctly, e.g., whether the wireless network devices are connected to power and whether they receive sufficient power for operation.

The ephemeral GW or the mobile configuration device can include or be connected to an image sensor-based system, e.g., a camera-based system. The image sensor-based system can be configured for validating correct operating, positioning and/or installation of the wireless network devices. For example, if the wireless network devices are lighting devices, the image sensor-based system can validate whether the lighting device emits light when it is activated. The image sensor-based system can include a lumen sensor in order to determine a change in brightness and determine whether the lighting device is correctly operating based on a change in the brightness, when the lighting device is activated compared to the situation when it is deactivated.

Alternatively, validating the correct operating, positioning and/or installation of the wireless network devices can also be performed manually by a user by visually inspecting the wireless network devices and entering a corresponding result via a user interface of the mobile configuration device or a user interface connected to the mobile configuration device.

The at least one other GW can include one or more other GWs, such as for example two permanent GWs or three permanent GWs. For example, a first permanent GW may be a lighting GW, such as a Signify lighting GW and a second GW may be a heating ventilation air conditioning (HVAC) GW. The functionalities of a lighting GW and a HVAC GW may also be included in a single GW, e.g., a building management system (BMS) GW. The HVAC GW can for example control a wireless network device in form of a sensor, such as a people-occupancy sensor. The HVAC GW can be configured for determining a current people-occupancy per zone and provide this information to the lighting GW. The lighting GW can for example be configured for controlling the wireless network devices, e.g., activating or deactivating them, for example based on the information received from the HVAC GW. The ephemeral GW provided by the mobile configuration device may include both the functionalities of the lighting GW and the HVAC GW.

The ephemeral GW can be configured for configuring the wireless network devices in a same zone or a single-hop distance of the current position of the mobile configuration device. Since the ephemeral GW can be configured for configuring the wireless network devices in the same zone or a single-hop distance of the current position of the mobile configuration device, a shorter communication path between the ephemeral GW and the wireless network device may be achieved compared to an immobile GW. This may allow a more reliable and faster configuration of the wireless network devices that generates less data traffic as hopping over multiple intermediate wireless network devices to the at least one permanent GW is not required. In particular, if some of the wireless network devices are not or not correctly configured, the permanent GW may not be reached at all or not over certain communication paths. A different communication path would then need to be used causing additional data traffic and time delay until the wireless network device is configured.

Wireless network devices are considered to be in the same zone with the ephemeral GW if signals directly exchanged between the ephemeral GW and the wireless network devices have a signal quality above a threshold signal quality that allows direct wireless communication between the ephemeral GW and the wireless network devices. The signal quality may, for instance, include a received signal strength indication (RSSI). The wireless network devices may, for instance, be considered to be in the same zone with the ephemeral GW if they are within an area in which signals directly exchanged between the ephemeral GW and the wireless network devices have a RSSI above a threshold RSSI. The zone includes all wireless network devices that can directly wirelessly communicate with the ephemeral GW, i.e., without forwarding communication via intermediate wireless network devices.

Single-hop distance refers to a distance between the ephemeral GW and the wireless network device being configured by the ephemeral GW that has no intermediate wireless network devices between them for forwarding any data between them.

The ephemeral GW can be configured to take over control of a respective wireless network device from the at least one other GW if the respective wireless network device is in the same zone or single-hop distance of the current position of the mobile configuration device. For example, the ephemeral GW can have a higher priority value than the at least one other GW such that while the ephemeral GW is in the same zone or single-hop distance to the respective wireless network device, the ephemeral GW takes over control of the respective wireless network device from the at least one other GW. Controlling the wireless network devices in the same zone or single-hop distance of the ephemeral GW may allow a more reliable and faster operation of the wireless network devices with reduced data traffic.

The ephemeral GW can be configured for at least temporarily adjusting a functionality of the at least one other GW for the wireless network devices which are in the same zone or single-hop distance of the current position of the mobile configuration device if the at least one other GW is included in the wireless network with the ephemeral GW. This allows configuring the wireless network devices using the ephemeral GW instead of the permanent GW. Furthermore, the ephemeral GW may be used for controlling the wireless network devices. The ephemeral GW may provide a faster and more reliable configuring and controlling of the wireless network devices while reducing data traffic as wireless network devices in its proximity are configured and/or controlled.

Adjusting the functionality of the at least one other GW can for example include disabling it, silencing it, reducing its functionality, or changing its functionality. For example, the ephemeral GW can take over some functions of the other GW and the other GW can use some of its freed up resources to perform some network functions that are normally not performed by the other GW or the other GW can perform some network functions normally performed at a lower rate with a higher rate. Preferably, the ephemeral GW only adjusts the functionality of the at least one other GW if operating both, the ephemeral GW and the other GW in parallel causes issues.

The ephemeral GW can be configured for temporarily or permanently adjusting the functionality of the at least one other GW. Temporarily adjusting the functionality of the at least one other GW can be performed for a duration of a presence of the ephemeral GW in the wireless network. Permanently adjusting of the functionality of the at least one other GW can require an active restoration of the state of the at least one other GW before the ephemeral GW adjusted the functionality of the other GW. The functionality of the other GW may be, for example, actively restored by a user.

The ephemeral GW can be configured for using one or more communication protocols including BLE, Thread, Zigbee, and Wi-Fi communication protocols for configuring the wireless network devices. The ephemeral GW can for example be configured for using single hop Wi-Fi or Wi-Fi Mesh. Single hop Wi-Fi or Wi-Fi Mesh may be, for example, used for controlling wireless network devices in form of lighting devices.

The ephemeral GW may rejoin the wireless network. For example, the mobile configuration device may be a user's mobile phone, which is present in the wireless network regularly. The ephemeral GW can then regularly replace or augment the other GW in order to improve operation of the wireless network while it is present. When the ephemeral GW augments the other GW, both GWs can perform tasks in the wireless network and the ephemeral GW can adjust the functionality of the other GW during the duration of its presence in the wireless network.

The ephemeral GW can be configured for providing security related information of the wireless network in the configuration information. This may allow to improve the security of the wireless network. Security related information may include, for example, security keys, passwords, access right information, user information, or any other security related information.

The ephemeral GW can be configured for using at least the Zigbee communication protocol for configuring the wireless network devices. Alternatively or additionally, the ephemeral GW can be configured for acting as a temporary trust center (TC) that generates trust center link keys (TCLKs) for the wireless network devices of the wireless network. The ephemeral GW can furthermore be configured for making available for the at least one other GW TCLK information about the TCLKs as security related information in the configuration information in order to allow the at least one other GW to use the TCLKs or to arrive at own TCLKs based on the TCLK information made available by the ephemeral GW. This may allow the ephemeral GW to take the role of a network-forming device. Furthermore, this may allow to establish a more secure wireless network. Additionally, the ephemeral GW may be replaced by the other GW, for instance, after the configuration of the wireless network devices, while ensuring a secure wireless network. The TCLK information can include hashes of the TCLKs. The ephemeral GW can be configured for providing the hashes of the TCLKs to the other GW in order to allow the other GW to generate its own TCLKs. The ephemeral GW may also provide the TCLKs or hashes of the TCLKs to an intermediate location, such as a cloud server. TCLKs may also be generated at the intermediate location based on the TCLK information and provided to the other GW. Storing hashes instead of TCLKs may allow an improved security.

The ephemeral GW can be configured for using further communication protocols, such as Bluetooth Low Energy (BLE), Thread, and/or Wi-Fi communication protocols for configuring the wireless network devices. The ephemeral GW may be configured, for instance, for using another communication protocol than Zigbee for transmitting the security related information and in particular the TCLKs or their hashes. The ephemeral GW can be, for example, configured for transmitting Zigbee commissioning data to a respective wireless network device using BLE. The Zigbee commissioning data can include address information and security related information, in particular the TCLKs or TCLK information. The respective wireless network device can join the wireless network in which the TC is included with the commissioning data using Zigbee. Once the wireless network device has joined the wireless network it can operate in the wireless network. If the TC leaves the network without being replaced by another GW, the wireless network devices of the wireless network can still operate, albeit with a limited functionality, namely without the functionality provided by the GW until the ephemeral GW rejoins the wireless network or another GW joins the network in order to act as GW of the wireless network.

Alternatively, the Zigbee commissioning data may also be transmitted to the respective wireless network device using Zigbee. The respective wireless network device may comprise a sensor or a button and may be activated to join when the sensor or button is activated. The sensor may be a light sensor which can be activated by a flashlight shining on the sensor. The wireless network device may be configured by the ephemeral GW upon joining the wireless network.

The ephemeral GW can be configured for using a TC swap-out mechanism, e.g., the TC swap-out mechanism as described in Zigbee Smart Energy (ZSE) spec v1.4: Zigbee document 07-5356-21. The ephemeral GW can for example be configured for acting as the TC for configuring the wireless network devices or until the wireless network devices are updated, e.g., using over-the-air update (OTAU). The other GW can replace the ephemeral GW and act as TC after the wireless network devices are configured or after the wireless network devices are updated. This may allow a faster configuration of a secure wireless network.

The ephemeral GW can be configured for making available for the at least one other GW its address information in the configuration information in order to allow the at least one other GW to replace or augment the ephemeral GW in the wireless network. The address information can for example include short address and IEEE (Institute of Electrical and Electronics Engineers) address. This may allow replacing or augmenting the ephemeral GW by the other GW for example after the configuration of the wireless network devices without a need for reconfiguring the wireless network. The other GW can for example replace the ephemeral GW when the ephemeral GW is not in the proximity of the wireless network devices. The ephemeral GW can be configured for receiving address information, such as a short address and an IEEE address of the at least one other GW, in order to temporarily replace or augment the other GW in the wireless network. This may allow interchanging the other GW and the ephemeral GW whenever needed. The extended personal area network (PAN) identifier (EPID) can be chosen to be the same as the IEEE address of the GW. The IEEE address is a unique 64 bit identifier (ID) of a GW assigned to it for its lifetime. The short address is a 16 bit ID assigned to a device in a wireless network for its time in the wireless network. The short address of the TC can for example be 0x0000.

The ephemeral GW and the other GW may be swapped-out if the EPID of the ephemeral GW and the other GW are identical. The IEEE address of one of the GWs may be adjusted to the IEEE address of the other GW, preferably without being in the same wireless network at the same time. Alternatively, the EPID of the ephemeral GW and the permanent GW may be identical, even if the IEEE addresses of the ephemeral GW and the permanent GW are different to each other. One of the GWs may act as active TC, e.g., with short address 0x0000.

The ephemeral GW can for example be configured for configuring the wireless network devices and for being replaced by the other GW after the wireless network devices are configured. The ephemeral GW may also be configured for being replaced by the other GW after a software of the wireless network devices is updated, e.g., using OTAU. This allows to temporarily use the ephemeral GW to configure the wireless network.

In case that multiple mobile configuration devices are used for configuring wireless network devices of a respective wireless network, multiple ephemeral GWs can be provided. The ephemeral GWs can have an identical short address and configure different wireless network devices of the respective wireless network simultaneously or sequentially. Preferably, the ephemeral GW in closest proximity to a respective wireless network device, e.g., the ephemeral GW with lowest number of hops, lowest path cost, or highest signal quality, e.g., highest RSSI, to the respective wireless network device, configures the respective wireless network device. Each of the ephemeral GWs can be configured to send its own many-to-one-route-request (MTORR). The multiple ephemeral GWs can be configured for wirelessly communicating with each other in order to coordinate the configuring of the wireless network devices. For example, the ephemeral GWs can exchange configuration information and information about the wireless network devices that are in their proximity. Preferably, the multiple ephemeral GWs wirelessly communicate out-of-band or via a cloud server. The multiple ephemeral GWs may also wirelessly communicate via the wireless network. Coordinating the ephemeral GWs may allow to minimize the risk of creating routing loops, e.g., by avoid a sending of route requests (RREQs) at the same time.

Additionally or alternatively, the ephemeral GW can be configured for providing a network key to the at least one other GW. The network key can be included in the configuration information.

The ephemeral GW can be configured for configuring the wireless network devices in multiple phases including one or more of:

a phase of joining of the wireless network devices into the wireless network, a phase of grouping the wireless network devices, a phase of optimizing the wireless network, a phase of provisioning controls behavior of the wireless network devices in the wireless network, a phase of validating the controls behavior of the wireless network devices in the wireless network.

The phase of optimizing the wireless network can for example include updating of connections between the wireless network devices, e.g. mesh connections, of the wireless network, e.g. mesh network, setting up improved communication paths over intermediate wireless network devices, assigning roles for wireless network devices in case that not all of the wireless network devices are equal. The phase of optimizing can include, for example, updating a distribution of wireless network devices and GWs in the wireless network.

The phase of optimizing the wireless network may include, for instance, configuring, such as managing or tuning a behavior of dual-radio wireless network devices, e.g., dual-radio luminaires. Dual-radio wireless network devices may be configured for communicating via two different communication protocols or two different radios, e.g., WiFi and BLE or Zigbee and BLE. The dual-radio wireless network devices may be semi-concurrent, i.e., they may be configured for communicating via only one of the communication protocols at a given time. Or they can be concurrent and communicate with both communication protocols at the same time. The dual-radio wireless network device may include, for example, two radio chips for concurrently communicating using both communication protocols or one radio chip that provides signals to two different antenna arrays. The phase of optimizing can include configuring an operation, such as a time sharing, between the different communication protocols of a dual radio wireless network device.

For example, in a room with multiple wireless network devices in form of dual-radio luminaires and a switch communicating with BLE communication protocol, one of the dual-radio luminaires may be assigned the task to communicate with the switch using BLE and to provide information of the activation status of the switch to the other dual-radio luminaires using the Zigbee communication protocol. The dual-radio luminaire can be configured for spending a major part of its time in listening for BLE communication from the switch in order to ensure a fast reaction to the switching of the switch, e.g., activation of light provided by the luminaires when the switch is activated. The dual radio luminaire performing the listening task may be not assigned to interact with the ephemeral GW in order to avoid an overloading of the dual radio luminaire.

The phase of provisioning controls behavior can for example include determining which switch or sensor controls which wireless network device or group of wireless network devices. The phase of provisioning controls behavior can also for example include determining which switch or sensor controls which wireless network device or group of wireless network devices with which default level.

The phase of provisioning controls behavior may furthermore include, for instance, providing device-specific configuration information in order to provision controls behavior, and providing different operation modes, such as a wireless network device listening mode in which a wireless network device listens for signals of other wireless network devices, a hub wireless network device mode in which the wireless network device acts as a hub wireless network device, a wireless network joining mode, an optimization mode, a configuration mode, or a GW-less mode in which no GW is included in the wireless network.

The phase of validating the controls behavior can be performed, for example, by automatically validating the controls behavior using an image sensor-based system or it can include a duration in which a person can manually perform a validation of the controls behavior. The automatic and manual validation can also be combined for validating the controls behavior, e.g., by performing a walk test for checking whether an occupancy sensing behavior is acting as intended. For instance, this may allow to validate in an open office, whether lights adjacent to a walk path are configured in a corridor mode, i.e., they only trigger occupancy if someone is sitting at a desk for a certain duration, but not if someone passes through a corridor.

The phase of validating the controls behavior may include, for instance, validating whether the operation modes are correctly configured and/or performed. For example, the ephemeral GW and/or the at least one other GW may pretend that it is not a GW and check after which time or whether at all the wireless network devices switch to an operation mode without a GW, i.e., the GW-less mode. It may furthermore be checked what is the resulting error data traffic, e.g., via the number of retries or RREQs and the switching behavior between the operation modes may be adapted by the wireless network devices over time.

The phase of validating the controls behavior may include, for instance, sensor coverage testing, calibration validation, or the like.

The ephemeral GW can be configured for performing the phases of configuring the wireless network devices based on different criteria including:

whether wireless network devices in the proximity of the mobile configuration device are of a same type, a number of wireless network devices in the proximity of the mobile configuration device, a current number of wireless network devices in the wireless network, whether another ephemeral GW is in the proximity of a wireless network device that is to be configured, whether a wireless network device that is to be configured is connected to the at least one other GW.

The ephemeral GW can be configured for one or more of providing network parameters to the wireless network devices, setting configuration parameters of the wireless network devices, providing software updates for software of the wireless network devices, determining status information of the wireless network devices. Providing network parameters to the wireless network devices may allow for optimizing a selection of network channels used for wirelessly communicating in the wireless network, such as radio frequency (RF) network channels, considering other wireless networks. Network channels used by other wireless networks, e.g., by another wireless network using Zigbee or another wireless network using Wi-Fi for wirelessly communicating, may be avoided.

The configuration parameters can include various output values of the wireless network devices including a maximal output value, a minimal output value, a default output value, a directivity value of the output, or any other output value. If the wireless network devices include lighting devices, the configuration parameters can for example include maximal light output, minimal light output, default light output, light directivity or any other configuration parameter.

Setting configuration parameters of the wireless network devices may be performed in order to calibrate and/or optimize them.

Software updates may be performed, for instance, using OTAU.

The status information of the wireless network devices can include software versions of the software of the wireless network devices, device health statuses, or any other status information.

In a further aspect of the present invention a configuration system is presented. The configuration system comprises at least one other GW, a set of wireless network devices, and one or more mobile configuration devices according to any of the claims 1 to 8, or any embodiment of the mobile configuration device. The one or more mobile configuration devices are configured for providing one or more ephemeral GWs. The one or more ephemeral GWs are configured for configuring wireless network devices of the set of wireless network devices in the proximity of the mobile configuration devices that provide them, for acting as a gateway or gateways of the wireless network, and for making available for the at least one other gateway the configuration information of the wireless network obtained during configuring the wireless network devices.

The at least one other gateway can be configured for controlling the wireless network based on the configuration information made available by the one or more ephemeral gateways.

The configuration system can include one or more subsystems, e.g., a lighting configuration system, a HVAC configuration system, or any other type of configuration system. The ephemeral GW or ephemeral GWs provided by the mobile configuration devices can be configured for configuring the wireless network devices of a further subsystem while a first subsystem is operating. This may allow an improved installation of several subsystems. The operating of the subsystems in combination can be validated using the ephemeral GW. The ephemeral GW can be configured for configuring the wireless network devices of a further subsystem based on the configuration information of the wireless network devices of the first subsystem or previously configured subsystems. This may allow the ephemeral GW to learn from previous settings and to perform a faster configuration of the wireless network devices of further subsystems. The configuration system can be configured for merging the first subsystem or previously subsystems with the further subsystem into a wireless network. The configuration system can be configured for providing the configuration information of the wireless network devices of the further subsystem and merge it with the configuration information of the wireless network devices of the first subsystem or previously configured subsystems in order to obtain configuration information of the merged wireless network.

In order to obtain the configuration information, the ephemeral GW that configures the wireless network devices of the further subsystem can be provided with the configuration information by the at least one other GW of the first subsystem or previously configured subsystems or the ephemeral GW or ephemeral GWs that configured the wireless network devices of the first subsystem or previous subsystems. The other GW or ephemeral GW of the wireless network of the first subsystem or previous subsystems can be provided with the configuration information of the wireless network of the further subsystem by the ephemeral GW that configured the further subsystem or by another GW that controls the wireless network of the further subsystem.

The configuration system can be configured for causing the ephemeral GW that configures the wireless network devices of the further subsystem to modify at least part of the configuration information, e.g., changing PANIDs and/or network channels while keeping network (NWK) key and EPID of the wireless network of the first subsystem or previously configured subsystems. A nwkUpdateID may be decremented for pretending that the settings are old network settings.

Multiple mobile configuration devices can be used by multiple users for configuring the wireless network devices of the configuration system. For example, the multiple mobile configuration devices may be used for configuring the configuration system including a lighting configuration system. This may allow for configuring the wireless network devices in parallel and merge the configuration information in order to fasten up the configuration of the wireless network devices. The lighting configuration system can for example include more than 200 wireless network devices including lighting devices, switches, and sensors. In an outdoor application, e.g., a streetlight configuration system, can have for example 4000 wireless network devices.

The configuration system can be configured for running in distributed security mode. This allows operating the wireless network without a TC.

The one or more ephemeral GWs can be configured for detecting wireless network devices of the set of wireless network devices. For example, the detected wireless network devices can be configured by the one or more ephemeral GW. One of the wireless network devices can be a hub wireless network device configured for providing detection signals or for providing detection signals more frequently than other wireless network devices in order to allow the one or more ephemeral GWs to detect the hub wireless network device faster than other wireless network devices. This may allow to connect the hub wireless network device faster to the wireless network.

The hub wireless network device can be configured for storing history information of the one or more ephemeral GWs. The history information can include short addresses, mappings of short addresses to IEEE addresses of the wireless network devices of the wireless network, storage capabilities on the wireless network devices, endpoints on the wireless network devices, simple descriptors on the wireless network devices, green power configuration information, groups of wireless network devices, routes, reporting configuration information, bindings, neighbor table information of the wireless network devices, endpoints present on the at least one other GW and/or the one or more ephemeral GWs. The neighbor table information of the wireless network devices, for example, includes the direct or nearest neighbors of each of the wireless network devices, e.g., which are in one hop distance and can be used for determining routes. The history information may also include, for instance, scenes, such as lighting scenes, or other preconfigured scenarios, of functions performed by the wireless network devices and/or the GW in the wireless network. The history information can for example include many-to-one-routes to the wireless network devices of the wireless network such that when the one or more ephemeral GW connects with the hub wireless network device, the ephemeral GW can immediately wirelessly communicate via the many-to-one-routes with the other wireless network devices of the wireless network. The ephemeral GW may also use routes stored in the history information for wirelessly communicating with any of the wireless network devices.

The configuration system can include a sensor-based system configured for checking a status of at least one of the wireless network devices. The sensor-based system can also be configured for checking statuses of more than one of the wireless network devices. The status can include whether the wireless network device is activated, inactivated, powered, unpowered, malfunctioning, working, or any other status. This may allow an automatic validation of several functions of the wireless network devices.

The sensor-based system can include a sensor and a processor. The sensor-based system can be included in the one or more mobile configuration devices, their ephemeral GWs, or be a separate device of the configuration system. The sensor can for example be an image sensor. The image sensor can be configured for providing images of wireless network devices. The image sensor can for example be a camera. The processor can be configured for processing the images, e.g., using image processing methods, such as image recognition methods. The processor can for example be configured for determining whether a wireless network device in form of a connected lighting device is activated or deactivated based on the image provided by the image sensor. The sensor can also for example be a lumen or light sensor for measuring a lumen value at the position of the sensor. The processor can be configured for determining whether a wireless network device in form of a connected lighting device is activated or deactivated based on measured lumen value or change of a measured lumen value.

In a further aspect of the present invention a method for configuring a set of wireless network devices and at least one other GW of a wireless network using a mobile configuration device is presented. The method comprises the steps:
  providing an ephemeral GW located at a current position of the mobile configuration device,
    the ephemeral GW configuring wireless network devices of the set of wireless network devices which are in proximity of the mobile configuration device,
    the ephemeral GW acting as a GW of the wireless network, and
    the ephemeral GW making available for the at least one other GW configuration information of the wireless network obtained during configuring the wireless network devices.

The method can include a step of creating a wireless connection to the wireless network devices. The wireless network connection may, for instance, be created using the Zigbee communication protocol or any other communication protocol.

The method can include a step of the ephemeral GW wirelessly communicating with and providing network parameters of the wireless network, security related information and/or its address information to the wireless network devices. The network parameters, security related information, and/or its address information may, for instance, be included in the configuration information.

The method can include a step of storing configuration information of the wireless network. The configuration information can for example be stored by the ephemeral GW, the other GW, or a cloud server. The method can include a step of controlling the wireless network based on the configuration information made available by the ephemeral GW. The wireless network can for example be controlled by the other GW or the ephemeral GW. The method can also provide more than one ephemeral GW.

The method can include a step of:
  adjusting a functionality of the at least one GW. Adjusting the functionality of the at least one GW may include disabling, silencing, or reducing the functionality of the at least one other GW. The functionality of the at least one GW may be adjusted if the at least one GW and the ephemeral GW are included in the same wireless network. The functionality of the at least one GW may be, for instance, adjusted for the wireless network devices which are connected to the ephemeral GW or which are currently being configured by the ephemeral GW.

The method can include one or more of the steps:
  joining of the wireless network devices into the wireless network,
  grouping the wireless network devices,
  optimizing the wireless network,
  provisioning controls behavior of the wireless network devices in the wireless network,
  validating the controls behavior of the wireless network devices in the wireless network,
  providing network parameters to the wireless network devices,
  setting configuration parameters of the wireless network devices,
  providing software updates for software of the wireless network devices,
  upgrading software on the wireless network devices,
  validating correct operating of the wireless network devices,
  validating correct positioning of the wireless network devices,
  validating correct installation of the wireless network devices,
  establishing security credentials,
  establishing network configuration,
  establishing application configuration,
  validating security credentials,
  validating network configuration,
  validating application configuration,
  determining status information of the wireless network devices.

In a further aspect, a computer program product for configuring wireless network devices and at least one other GW of a wireless network using a mobile configuration device is presented. The computer program product comprises program code means for causing a processor to carry out methods as defined herein throughout, or any embodiment of a method, when the computer program product is run on the processor.

In a further aspect, a computer readable medium having stored computer program product is presented. Alternatively or additionally, the computer readable medium can have the computer program product according to any embodiment of the computer program product stored.

It shall be understood that the mobile configuration devices, the configuration systems, the methods, the computer program products, and the computer readable mediums have similar and/or identical preferred embodiments, in particular, as defined herein throughout.

It shall be understood that a preferred embodiment can also be any combination of single elements and/or complete embodiments provided herein throughout.

These and other aspects of the invention will be apparent from and elucidated with reference to the embodiments described hereinafter.

DETAILED DESCRIPTION OF EMBODIMENTS

Figure 1:
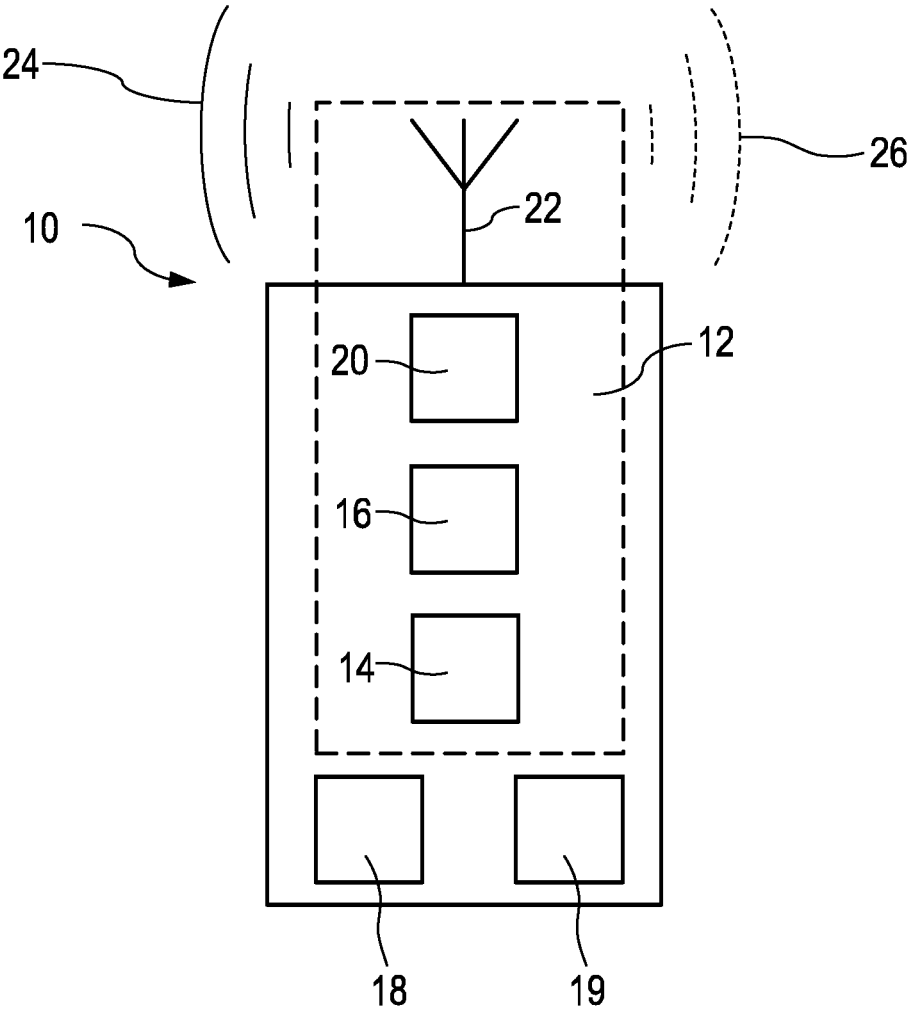
FIG. 1 shows schematically and exemplarily an embodiment of a mobile configuration device.

FIG. 1 shows schematically and exemplarily an embodiment of a mobile configuration device in form of a cellular phone 10. The cellular phone 10 can be used for providing an ephemeral GW 12 located at a current position of the cellular phone 10. The ephemeral GW 12 can be used for configuring wireless network devices in proximity of the cellular phone 10. The wireless network devices can already be organized in a wireless network or they can be joined in a wireless network using the ephemeral GW 12. The ephemeral GW 12 can furthermore act as a GW for the wireless network and for making available for at least one other GW, e.g., a permanent GW or another ephemeral GW, configuration information of the wireless network obtained during configuring the wireless network devices.

The cellular phone 10 includes a processor 14, a computer readable medium in form of memory 16, a user interface 18, a sensor-based system in form of a camera 19, a transceiver 20, and an antenna array 22. The camera is optional. Instead of a camera the sensor-based system may also include an image sensor or be an image sensor-based system or any other type of sensor-based system. Instead of an antenna array, also a single antenna may be provided.

The processor 14 can perform calculations and process data.

The memory 16 stores the data, such as configuration information of the wireless network. The configuration information includes network parameters including TCLKs of the wireless network devices, hashes of TCLKs, short addresses and IEEE addresses of the ephemeral GW and the wireless network devices, PAN IDs, network channels used by the wireless network, and a nwkUpdateID.

The memory 16 furthermore stores a computer program product for configuring wireless network devices and at least one other GW, e.g., a permanent GW, of a wireless network using a mobile configuration device, e.g., the cellular phone 10. The computer program product comprises program code means for causing the processor 14 to carry out a respective method for configuring the wireless network devices and the at least one other GW, e.g., the method as presented in FIG. 5, when the computer program product is run on the processor 14.

The user interface 18 is a touch display in this embodiment and allows a user to interact with the cellular phone 10. In other embodiments, another type of user interface may be provided, such as an audio interface, a keyboard, or any other type of user interface.

The camera 19 can be used for checking a status of one or more of the wireless network devices, e.g., whether they are activated, deactivated, broken, or any other type of status.

The transceiver 20 is used for wirelessly communicating with servers, base stations, wireless network devices or other types of wirelessly communicating devices via transmitting and receiving wireless signals using the antenna array 22. The transceiver 20 uses the Zigbee communication protocol in order to transmit Zigbee signals 24 and the Wi-Fi communication protocol in order to transmit Wi-Fi signals 26, i.e., the transceiver 20 is a dual-radio transceiver. In other embodiments, the transceiver can also be configured for transmitting and receiving other and/or further types of wireless communication signals, e.g., provided on the basis of the Thread communication protocol or the BLE communication protocol.

Figure 2:
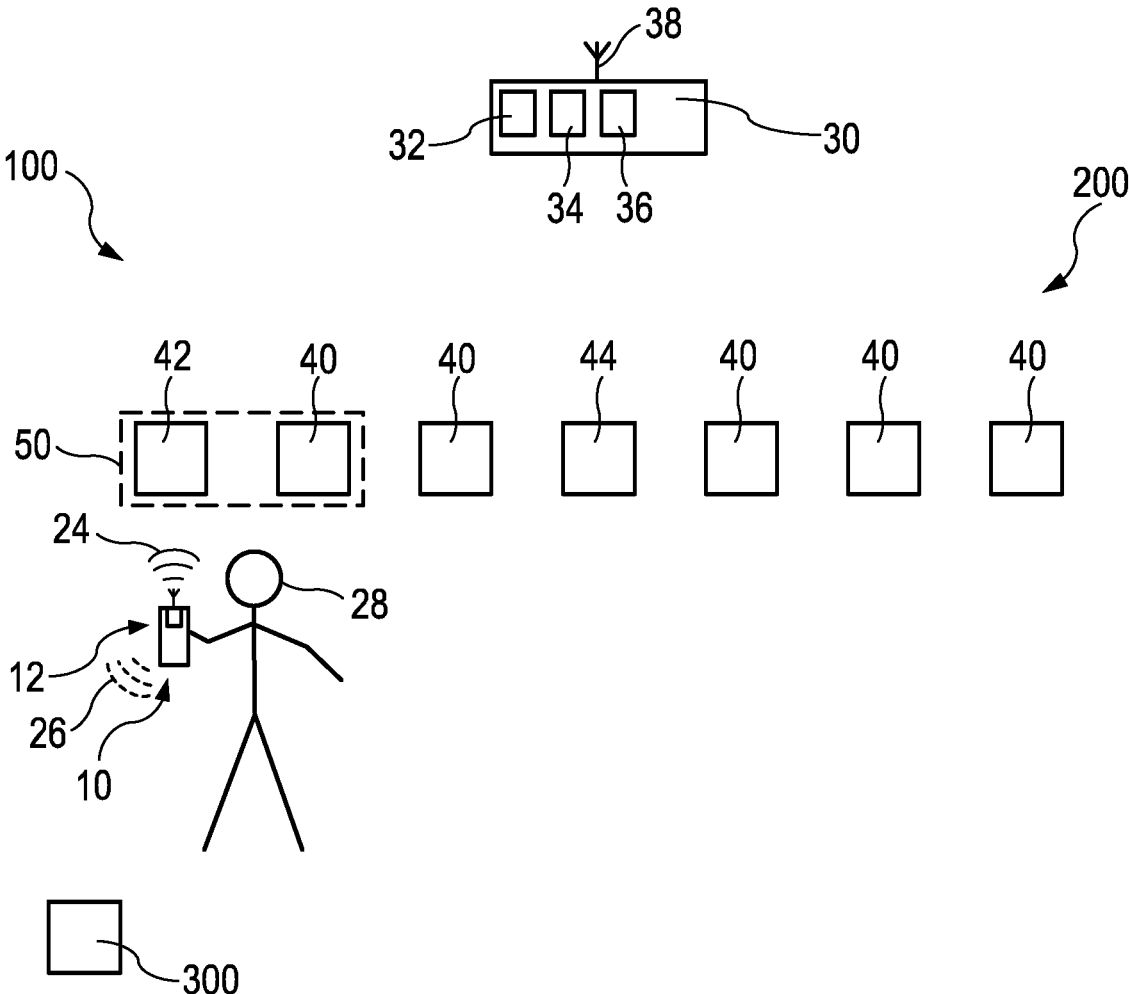
FIG. 2 shows schematically and exemplarily an embodiment of a configuration system with a mobile configuration device at a first position.

The ephemeral GW 12, in this embodiment, is formed by components of the cellular phone 10, namely, the processor 14, the memory 16, the transceiver 20, and the antenna array 22. In other embodiments, the ephemeral GW may also be a computer program product running on the cellular phone. FIG. 2 shows schematically and exemplarily an embodiment of a configuration system in form of a lighting configuration system 100 with a mobile configuration device in form of cellular phone 10 of FIG. 1 at a first position. In other embodiments, another mobile configuration device may be included in the configuration system.

Figure 3:
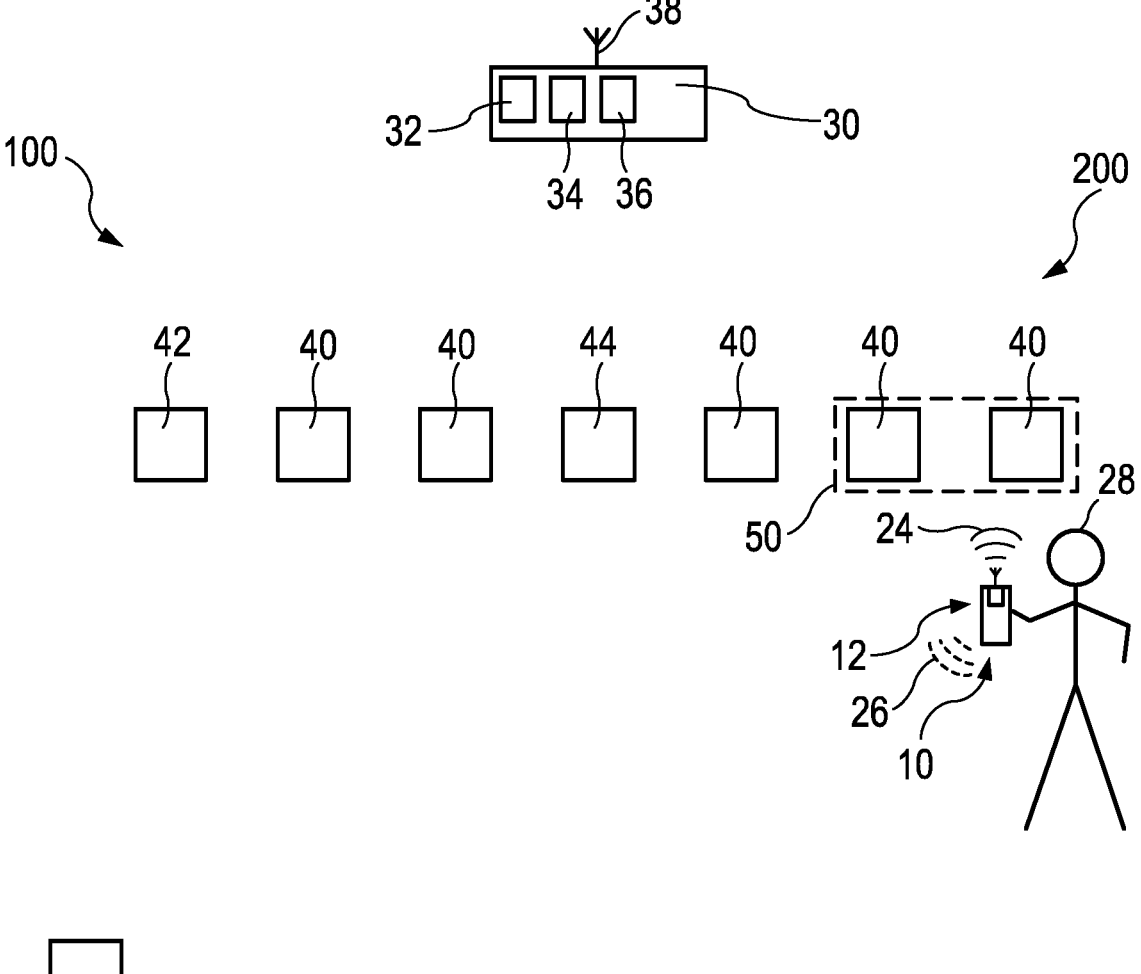
FIG. 3 shows schematically and exemplarily the embodiment of the configuration system with the mobile configuration device in a second position.
Figure 4:
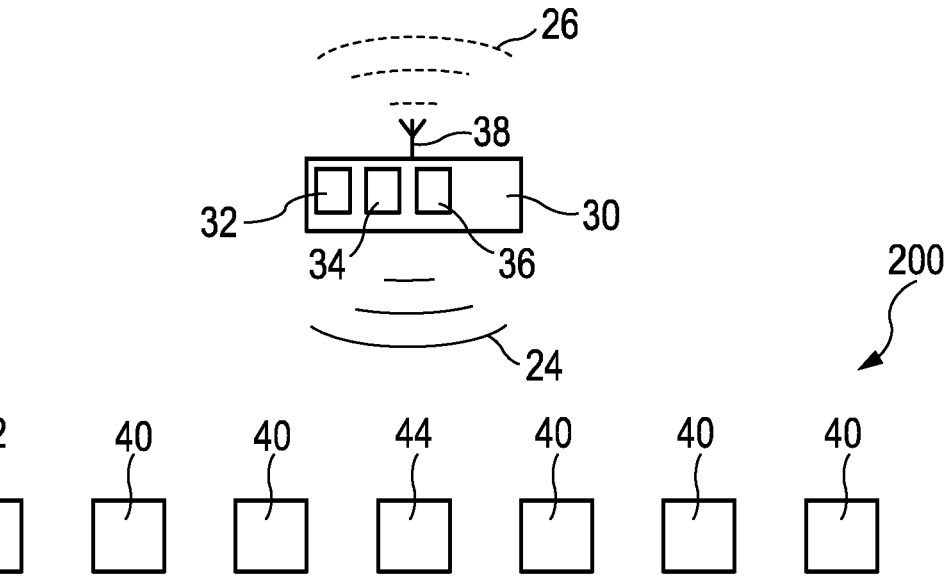
FIG. 4 shows schematically and exemplarily the embodiment of the configuration system controlled by a permanent GW.
Figure 4:
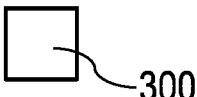

The lighting configuration system 100 is used for configuring another GW in form of a permanent GW 30 and a set of wireless network devices 40, 42, and 44 of a wireless network 200. The permanent GW 30 may already be installed or may be installed at a later point of time. In this embodiment, the permanent GW 30 is already installed. A user 28 carries the cellular phone 10 to different positions along the set of wireless network devices 40, 42, and 44. The first position is shown in FIG. 2 and a second position of the cellular phone 10 is shown in FIG. 3. In FIG. 4 the cellular phone 10 is removed from the wireless network 200.

The cellular phone 10 provides an ephemeral GW 12 at its current position. The ephemeral GW 12 can be used for configuring the wireless network devices 40, 42, and 44. The set of wireless network devices 40, 42, and 44 includes luminaires 40, a sensor 42, and a switch 44. The wireless network devices 40, 42, and 44 wirelessly communicate with the ephemeral GW 12 provided by the cellular phone 10 via Zigbee communication protocol.

In other embodiments, the ephemeral GW may be configured for using one or more other communication protocols for configuring the wireless network devices and/or wirelessly communicating with the wireless network devices including, for example, BLE, thread, Wi-Fi or any other communication protocol. For example, the ephemeral GW may be configured for using at least the Zigbee communication protocol for configuring the wireless network devices. Further communication protocols may be used for communicating. Alternatively, BLE-based commissioning or configuring may be performed either by tunneling Zigbee commands, or a BLE-based mechanism to transfer network parameters relevant for the wireless network devices may be used.

The permanent GW 30 includes a processor 32, a memory 34, a transceiver 36, and an array of antennas 38. The processor 32 can perform the same functions as processor 14 of the cellular phone 10. The memory 34 can perform the same functions as memory 16 of cellular phone 10. The transceiver 36 and array of antennas 38 can perform the same functions as the transceiver 20 and array of antennas 22 of the cellular phone 10. The permanent GW 30 can be used to control the wireless network devices 40, 42, and 44 once they have been configured. The wireless network devices 40, 42, and 44 each comprise a transceiver for wirelessly communicating with the ephemeral GW 12 and the permanent GW 30 (not shown). The wireless network devices 40, 42, and 44 furthermore can include a processor and a memory or a microchip including the functionalities for forming the wireless network 200 with the wireless network devices 40, 42, and 44 and the permanent GW 30 or the ephemeral GW 12 (not shown).

In other embodiments, the configuration system can also comprise one or more mobile configuration devices, at least one other GW, e.g., a permanent GW or another ephemeral GW, and a set of wireless network devices. The one or more mobile configuration devices can be configured for providing one or more ephemeral GWs for configuring wireless network devices of the set of wireless network devices in their proximity, for acting as a GW or GWs of the wireless network, and for making available for the at least one other GW the configuration information of the wireless network obtained during configuring the wireless network devices. The at least one other GW can be configured for controlling the wireless network based on configuration information received from the one or more ephemeral GWs.

In this embodiment, the ephemeral GW 12 configures the wireless network devices 40, 42, and 44 of the wireless network 200 in proximity of the cellular phone 10. In this embodiment, the ephemeral GW 12 acts as a GW for the wireless network 200. The ephemeral GW 12, furthermore, makes available for the permanent GW 30 the configuration information of the wireless network obtained during configuring the wireless network devices 40, 42, and 44. In this embodiment, the configuration information generated during the configuration process is stored by the ephemeral GW 12 and provided to the permanent GW 30. This allows the permanent GW 30 to control the wireless network 200, e.g., taking over control from the ephemeral GW 12 while it is still present or once the ephemeral GW 12 is gone. In other embodiments, the ephemeral GW 12 may also provide the configuration information to an intermediate location, such as a cloud server. The cloud server can store the configuration information and provide it to the other GW, e.g., an ephemeral GW joining the wireless network or a permanent GW, when it is installed. In this embodiment, the permanent GW 30 is not operating while the ephemeral GW 12 configures the wireless network 200 in FIGS. 2 and 3. In other embodiments, the permanent GW may run in parallel with the ephemeral GW, e.g., performing other functions than configuring the wireless network devices, such as controlling the wireless network devices that have already been configured. Controlling, for instance, includes switching the luminaires 40 on or off in dependence of activation and deactivation signals.

In FIG. 2, one luminaire 40 and the sensor 42 are in a single-hop distance 50 of the current position of the cellular phone 10 and are configured by the ephemeral GW 12. In other embodiments, the mobile configuration device can be configured for configuring wireless network devices in a same zone with the mobile configuration device.

In a first configuration step, the camera 19 of the cellular phone 10 is used to check whether the luminaire 40 and the sensor 42 in single-hop distance 50 are installed at a correct position. Therefore, an image can be generated at the current position of the cellular phone 10. Furthermore, a viewing direction of the cellular phone 10 can be provided and the image can be compared to a floor plan for installing the wireless network devices 40, 42, and 44 in order to determine, whether the luminaire 40 and the sensor 42 have been installed at a correct position. Alternatively, the user 28 may manually validate whether the installation position of the luminaire 40 and the sensor 42 is correct by visually checking it and using the touch display 18 to input a validation information.

In other embodiments, the camera or any other sensor-based system configured for checking a status of at least one of the wireless network devices may also be included in one of the wireless network devices or it may be a standalone system of the configuration system.

The ephemeral GW 12 may actively send signals and listen for reply signals of wireless network devices 40, 42, and 44 in order to detect them.

In this embodiment, sensor 42 is a hub wireless network device that provides detection signals to the ephemeral GW 12, i.e., the hub wireless network device 42 actively sends detection signals to the ephemeral GW 12. This allows the ephemeral GW 12 to detect the sensor 42 faster. In other embodiments, all wireless network devices may provide detection signals and the hub wireless network device or hub wireless network devices may provide detection signals more frequently than other wireless network devices in order to allow the one or more ephemeral GWs to detect the hub wireless network device or hub wireless network devices faster than other wireless network devices.

Sensor 42 furthermore stores history information of the ephemeral GW 12. The history information includes previous configuration information if available and history data of the ephemeral GW, e.g., when the ephemeral GW joined and/or left the wireless network 200. The history information may include, for instance, short addresses, mappings of short addresses to IEEE addresses of the wireless network devices of the wireless network, storage capabilities on the wireless network devices, endpoints on the wireless network devices, simple descriptors on the wireless network devices, green power configuration information, groups of wireless network devices, routes, reporting configuration information, bindings, neighbor table information of the wireless network devices, endpoints present on the at least one other GW and/or the one or more ephemeral GWs. In other embodiments, the hub wireless network device can be configured for storing history information of the one or more ephemeral GWs. The hub wireless network device can be configured for providing the history information to the ephemeral GW in order to speed up the configuration process. For example, in case that multiple ephemeral GWs are used for configuring the wireless network devices in parallel, an ephemeral GW can be provided with configuration information of the wireless network devices configured by another ephemeral GW.

In this embodiment, the ephemeral GW 12 acts as a temporary TC, generates TCLKs for the wireless network devices 40, 42, and 44 and provides them as well as its address information to the permanent GW 30. The address information includes short address and IEEE address of the ephemeral GW 12.

In a second configuration step, the ephemeral GW 12 sends Zigbee signals 24 to the sensor 42 and luminaire 40 in single-hop distance 50 and joins them to the wireless network 200 for wirelessly communicating with them. The ephemeral GW 12 then generates TCLKs for the sensor 42 and luminaire 40, and provides the TCLKs to the sensor 42 and the luminaire 40. Furthermore, the ephemeral GW 12 assigns the sensor 42 and the luminaire 40 with short addresses and provides them with its address information as well as relevant parameters such as network channel, PAN ID and EPID. This allows to establish a network structure using the ephemeral GW 12. The short addresses may, for instance, be used for routing of communication. The ephemeral GW 12 stores these network parameters in form of configuration information of the wireless network 200 in the memory 16. In this embodiment, the ephemeral GW 12 stores TCLK information about the TCLKs, namely hashes of the TCLKs, as well as its address information in the configuration information. The hashes of the TCLKs can be used by the permanent GW 30 to generate own TCLKs based on the hashes of the TCLKs, for instance, in a handshake with each wireless network device 40, 42, and 44. In other embodiments, the TCLKs can also be directly stored in the configuration information.

In this embodiment, the ephemeral GW 12 provides the configuration information to a server 300 via Wi-Fi signals 26, as well as directly to the permanent GW 30. The permanent GW 30 generates TCLKs from the hashes of the TCLKs and uses the address information of the ephemeral GW 12 in order to replace or augment it. This allows the permanent GW 30 to replace or augment the ephemeral GW 12 and control the wireless network 200 based on the configuration information received from the ephemeral GW 12. If the permanent GW 30 is installed only after the ephemeral GW 12 is gone, the permanent GW 30 may be provided with the configuration information from the server 300 via Wi-Fi signals 26.

In other embodiments, the ephemeral GW may provide further network parameters to the wireless network devices, set configuration parameters of the wireless network devices, provide software updates for software of the wireless network devices, and determine status information of the wireless network devices.

In other embodiments, the ephemeral GW can furthermore group the wireless network devices, optimize the wireless network, provision controls behavior of the wireless network devices, and validate the controls behavior of the wireless network devices in the wireless network.

In this embodiment, however, the ephemeral GW 12 is only used for configuring the wireless network devices 40, 42, and 44 and joining them into the wireless network 200 in the sense of establishing a functioning network structure. Further configurations, such as grouping, optimizing, and provisioning controls behavior can be performed by the permanent GW 30 once the ephemeral GW 12 has provided configuration information to it.

In other embodiments, the ephemeral GW may be, for instance, configured for adjusting a functionality of the at least one other GW, such as disabling, silencing, or reducing a functionality of the at least one other GW for the wireless network devices which are in the same zone or single-hop distance of the current position of the mobile configuration device. The ephemeral GW will only adjust the functionality of the at least one other GW, if it is included in the wireless network.

In other embodiments, the ephemeral GW can be configured for configuring the wireless network devices in multiple phases. The multiple phases can include one or more of:
  a phase of joining of the wireless network devices into the wireless network,
  a phase of grouping the wireless network devices,
  a phase of optimizing the wireless network,
  a phase of provisioning controls behavior of the wireless network devices in the wireless network,
  a phase of validating the controls behavior of the wireless network devices in the wireless network.

Further embodiments of the configuration system are presented in the following:

In a second embodiment of the configuration system, configuring is made faster and/or more predictable by utilizing an ephemeral GW as TC in single-hop distance of wireless network devices in form of luminaires that are to be configured. The second embodiment of the configuration system uses Zigbee communication protocol for configuring the luminaires. The user acts as an installer or commissioner that can visually validate a health status or operational status of the luminaires and their configuration at the moment of installation without exposure to potential wireless network latency or even incompleteness of the Zigbee wireless networking infrastructure. In this embodiment, a luminaire blinks when it has been correctly provisioned. The network connection of the luminaire can for example be checked by sending and receiving a control command signal and visual validation of the luminaires reaction to the control command signal. As the ephemeral GW is in single-hop distance to the luminaires when configuring them, its communication path is short and thus reliable. It does not require hopping through a number of intermediate nodes, i.e., other luminaires, that may not yet be configured and without slow higher-level retries caused by unreliable communication. The ephemeral GW may also create a list of luminaires already configured and provided with addresses and/or address information.

The ephemeral GW in the second embodiment of the configuration system, in contrast to prior art GWs does not immediately start discovering and configuring a wireless network device which is joined into the wireless network. This allows to reduce unwanted data traffic by discovery, e.g., including transmission of addresses, endpoints, simple descriptors, basic cluster, other clusters and by configuration, e.g., including transmission of groups, bindings, reporting, software version while other wireless network devices are still joining and require bandwidth therefore. In addition, the ephemeral GW delivers controlled behavior. In prior art systems, upon joining of a wireless network device, the prior art GW would start automatically performing discovery and configuration of the wireless network device. Utilizing the ephemeral GW may allow to execute discovery and configuration (i) at a later point in time, when the joining is complete and/or (ii) executing it more efficiently, e.g. using pre-established groups of identical wireless network devices in single-hop distance or the same zone and/or (iii) executing it over single hop Zigbee or over BLE.

The configuration process can be performed in multiple phases according to different criteria. For example, the minimum necessary steps for establishing a network fabric or network structure may be performed and all optimization actions and application level configuration actions can be delayed until a later point of time. Alternatively, all stack-related configuration activities can be performed and all application-related configuration activities can be delayed until a later point in time. Yet alternatively, all node-triggered configuration actions, i.e., configuration actions triggered by the wireless network devices, in particular, the luminaires, can be performed and all GW- and/or system-triggered configuration actions can be delayed until a later point in time. The configuration system may include an additional control algorithm running on the processor used by the ephemeral GW for causing it to pause and resume the joining and/or configuration process.

In yet another embodiment, a configuration of a configuration system in form of a standalone lighting configuration system that does not include a permanent GW can be performed via a cellular phone acting as ephemeral GW to facilitate as user interface for the configuring of the wireless network devices in the lighting configuration system. Other ephemeral GWs may join the standalone lighting configuration system from time to time. In that case, an installer may already name and/or indicate a location, e.g., a location in single hop distance to one or more wireless network devices, where a potential ephemeral GW may appear. For example, a facility manager's cellular phone including the ephemeral GW may always enter via a specific entrance, e.g., an elevator lobby or he typically sits at his desk directly under a particular wireless network device of a particular zone or wireless network. This wireless network device may be a hub wireless network device. In other embodiments, there may also be multiple hub wireless network devices present, e.g., at different locations. The hub wireless network device, e.g., a hub luminaire, in that location may be configured to look out for the ephemeral GW, enabling a fast detection and connection to the lighting configuration system. For example, the hub luminaire may send a special BLE beacon or some special indication in its BLE beacon so the ephemeral GW on the facility manager's cellular phone can easily identify it. Alternatively or additionally, the hub luminaire may also send the BLE beacons more often than other, less preferred wireless network devices, e.g., luminaires. The hub luminaire may also store additional information about the ephemeral GW, e.g., history information, such as information over a period of absence of the ephemeral GW, when the ephemeral GW was in an inactive state, information about a short to long address mapping, endpoints present on the GW, etc. The hub luminaire may also maintain extended network connectivity on behalf of the ephemeral GW, e.g. it may have an increased number of neighbors and additional routes or communication paths, for example including potentially many-to-one routes. This may allow the ephemeral GW to immediately communicate with the wireless network devices of the wireless network upon reconnection with the wireless network via the hub luminaire. In order to avoid double routes, the hub luminaire may advertise and/or maintain one route set that can be used for both the hub luminaire and the ephemeral GW.

In a third embodiment of the configuration system, an ephemeral GW is utilized to make configuring more reliable even if a permanent GW is present. It can be beneficial to use an ephemeral GW instead of a permanent GW, even if the configuration system, e.g., an upgradable standalone system (i.e. the system can in principle be installed without GW and permanent cloud connectivity, but a GW can be added at a later time) is already equipped with a permanent GW from the start. In the prior art, typically, the permanent GW is programmed for completely configuring a new wireless network device, before another wireless network device can be added to the wireless network. This can be lengthy and time intensive. For example, in case of multi-hop Zigbee joining it will include broadcast route discovery, broadcast short address discovery, and then a number of unicast messages, for discovering the active endpoints of the joining wireless network device, simple descriptors per endpoint, basic device information such as manufacturerID, modelID, etc., and default device configuration, e.g. reporting conditions, sensing settings, etc. The configuration process may also be traffic-intensive, e.g., including group and scene setting, configuration of reporting conditions or the like. This may be particularly problematic in larger dense networks, such as New York City streetlight network. For example, in the New York City streetlight network, Zigbee wireless lighting configuration systems have to be configured during night hours as during day network setup is unsuccessful due to interference in the 2.4 GHz spectrum, which leads to excessive completion times. Using the mobile ephemeral GW provided by an installer's cellular phone during configuring allows having physical proximity of the installer to the wireless network device or devices, e.g., streetlight, to be configured as the installer can stand directly underneath it. This may alleviate the above issues of the prior art.

In a fourth embodiment of the configuration system, an ephemeral GW is utilized for making the configuring process more flexible. In this case, the permanent GW is not installed at first but instead the ephemeral GW is used to configure wireless network devices installed before the permanent GW is installed and configured. In the prior art, an installer typically needs to add wireless network devices during setup of the wireless network from inwards to outwards starting first from the wireless network devices next to the permanent GW. This is required for ensuring that a reliable mesh forms that can reach the permanent GW during each phase of wireless network device localization and configuring and to get immediate confirmation from a wireless network device that it joined the wireless network. The prior art network formation process involves multi-hop messages on Zigbee which adds delay. Furthermore, in the prior art there is a risk that a configuration device of the installer may have a bad connection to the permanent GW, e.g., if the configuration device and the permanent GW use Wi-Fi communication protocol and the installer is far away from the permanent GW. Using the mobile ephemeral GW allows bringing the GW functionality in the vicinity of the joining wireless network device, and may thus give the installer freedom of choosing a configuration order without imposing a particular order of configuring the wireless network devices as required by the network topology. This may allow a faster installation and configuration of wireless network devices. For example, during office renovations certain rooms on a floor may be locked, such as private offices or not yet ready for installation of wireless network devices.

The ephemeral GW provides a configuration experience as if the GW would be mobile and always co-located with a physical position of the cellular phone of the installer performing the configuration of the wireless network devices in a building. The ephemeral GW can suppress or stop and delay discovery and further configuration of wireless network devices joined to the wireless network which on their own try to start discovery options, e.g., checking the network address or IEEE address of the ephemeral GW, establishing routes, starting reporting or the like. The delayed activities may include configuring related activities, like for example TCLK update, which is required for completion of Zigbee 3.0 joining process. The wireless network devices can be controlled by the ephemeral GW such that discovery options can be delayed and resumed at a later point in time, e.g., initiated by a control command signal of the ephemeral GW to the wireless network devices. Alternatively, the wireless network devices can be operated in a special mode, such as a configuring mode and/or maintenance mode, which determines which actions the wireless network devices perform. Graceful degradation may be used, for example, the ephemeral GW stops responding as soon as the configuring is done, because either the BLE connection is closed, or because the ephemeral GW ignores the BLE connection after the wireless network or wireless network device is configured. A wireless network device that joined the wireless network can detect this and stop and/or start some activities, e.g., discovery and configuration. Yet alternatively, a proxy server may be provided for stopping the traffic to the ephemeral GW once the wireless network is configured.

In a fifth embodiment of the configuration system, multiple ephemeral GWs are provided by multiple mobile configuration devices for parallelizing configuration of the wireless network devices. Using ephemeral GWs allows to parallelize the configuring process. For example, multiple mobile configuration devices can provide multiple ephemeral GWs for configuring multiple wireless network devices in proximity to the respective ephemeral GW. The ephemeral GWs can store configuration information of the wireless network devices and merge the information in order to form a merged wireless network of the wireless network devices configured by the multiple ephemeral GWs in parallel. The configuration information provided by the multiple ephemeral GWs can also be stored on an intermediate location, such as a cloud server and merged at the intermediate location. This can be particularly helpful for configuring large size networks e.g. streetlights in a wireless mesh punctuated by cellular router. Similarly, a large parking garage floor with, for example, 1000 wireless network devices per wireless network can be configured in parallel faster.

In a sixth embodiment of the configuration system, an ephemeral GW provides network parameters to wireless network devices in form of luminaires. This may allow for an easy maintenance of the wireless network or multiple wireless networks, e.g. in commercial buildings, formed by the wireless network devices. The ephemeral GW can select network parameters such as network identifiers, network security credentials, and network channel, rather than relying on them being randomly selected by the wireless network devices forming the wireless network. This may help in selecting optimized RF network channels as a spread of the other wireless networks through the building can be considered in order to avoid them as well as other network channels used for, e.g., Wi-Fi. For example, a certain floor can use a certain channel for Wi-Fi. The ephemeral GW can in reaction choose a Zigbee channel for that floor that does not conflict with the Wi-Fi channel. Other RF channels used by other Zigbee networks, e.g., for a HVAC configuration system, may also be avoided. As the ephemeral GW is mobile, configuring can be performed directly from a vicinity of the wireless network device. This may allow checking basic health status of the installation, e.g., whether power is connected and light is emitted from a wireless network device in form of a luminaire, and whether the luminaire can be controlled via the just established wireless network. Furthermore, this may allow checking and optionally also adjusting lighting-specific parameters, for example a maximum light output, minimum light output, default light output, light directivity, etc. The checking may be performed by a sensor-based system, such as a camera-based systems. The camera-based system may use coded light mechanisms for checking, e.g., based on image recognition algorithms.

In a seventh embodiment of the configuration system, an ephemeral GW is used for orchestrating a network formation of the wireless network. The ephemeral GW takes the role of the device forming the wireless network in order to have control over forming the wireless network creation process. This may allow providing to an installer using the ephemeral GW to have control about when to open the wireless network. Further, it may give the installer control about which wireless network device to add at which point in time which allows to influence a network topology of the wireless network. The ephemeral GW is used in a centralized or TC network in this embodiment. In other embodiments, the ephemeral GW can also be used in a distributed network. Wireless network devices may get admitted to join the distributed network via a distributed security mechanism or in distributed security mode performed by one or more of the wireless network devices without involvement of the ephemeral GW.

In this embodiment, the ephemeral GW is removed after the configuration of the wireless network is finished and it is replaced by an immobile permanent GW. In order to replace the ephemeral GW by the permanent GW, the ephemeral GW impersonates the permanent GW during configuring and/or OTAU, namely by using an identical short address and IEEE address as the permanent GW. Furthermore, TCLKs are provided from the ephemeral GW to the permanent GW. The permanent GW can furthermore be replaced by the ephemeral GW again, for example when the ephemeral GW rejoins the wireless network or the permanent GW may also be replaced by another ephemeral GW. Therefore, the permanent GW can provide the ephemeral GW with the TCLKs and its short and IEEE addresses.

Alternatively, a TC swap-out mechanism can be used for replacing the ephemeral GW with the permanent GW. In this case, the ephemeral GW acts as a TC only for configuring or OTAU and configures all the wireless network devices on the wireless network. When the ephemeral GW configured all wireless network devices on the wireless network, it hands down hashes of the TCLKs to the permanent GW. The permanent GW replaces the ephemeral GW and takes over control of the wireless network. Therefore, it generates its own unique TCLKs based on the hashes of TCLKs received from the ephemeral GW in a handshake with each of the wireless network devices. The alternative is beneficial in that it reduces security concerns. The TC swap-out behavior was for example defined in Zigbee by Zigbee smart energy (ZSE). In particular, the TC swap-out mechanism is described in ZSE spec v1.4: Zigbee document 07-5356-21.

In an eight embodiment, an ephemeral GW is used for temporarily mimicking the role of a permanent GW in order to make the network connect-ready. The ephemeral GW can configure the wireless network devices using knowledge of network parameters and store the network parameters as configuration information locally and/or in the cloud, e.g. on a cloud server. Once a permanent GW is added to the wireless network, the stored network parameters can be provided to the permanent GW in form of configuration information. The permanent GW can thus be added to the wireless network without any need of recommissioning or reconfiguration.

In this embodiment, the configuration system uses the Zigbee communication protocol for wirelessly communicating between the wireless network devices and the ephemeral GW. The ephemeral GW acts as TC in this embodiment. The following network parameters are stored in the configuration information: IEEE address for the TC, short address of the TC, network key, TCLKs of the wireless network devices, IEEE addresses of the wireless network devices and EPID. The short address of the TC is 0x0000. In case of multiple ephemeral GWs, the short address can be assigned to them semi-concurrently in turns or the multiple ephemeral GWs also are assigned with an identical IEEE address, such that the wireless network devices do not see any difference between two different ephemeral GWs. Each of the ephemeral GWs may send its own MTORR. The ephemeral GW closest to a wireless network device will configure it. The closest ephemeral GW can for example be determined based on path costs. The ephemeral GWs can coordinate each other in order to avoid sending RREQ at the same time and in order to minimize a risk of creating routing loops. Instead of storing the TCLKs of the wireless network devices, also corresponding hashes can be stored in order to increase the security. The EPID can be the IEEE address of the TC.

Using the network parameters, the wireless network is typically discoverable via an active scan, and PANID, network channel, and nwkUpdateID can be derived. Alternatively, these further network parameters may be stored as well in the configuration information. TC swap-out functionality of Zigbee can be used once a permanent GW is installed such that the permanent GW can replace the ephemeral GW or ephemeral GWs.

In case that a Zigbee wireless network is based on the distributed security mode, storing of the IEEE address intended for the GW and the short address intended for the GW is not required, and hashing of the TCLKs is also not required.

In a ninth embodiment, an ephemeral GW is used for enabling a user acting as an installer to independently configure two or more different configuration systems, such as a lighting configuration system, an HVAC configuration system, a smart metering system, and/or a plug load control system, e.g., for machinery. Furthermore, the wireless network devices of the two or more different configuration systems are independently validated and merged with each other in order to form one wireless network.

The lighting configuration system is typically a first appliance to be installed in a building, using lighting configuring methods, including the respective tool and interfaces. The installer of the lighting configuration system configures the lighting configuration system for operation, e.g., including lighting zones and/or lighting scenes, and typically leaves the building thereafter. The lighting configuration system has a permanent GW and wireless network devices in form of luminaires. The permanent GW may expose information to the cloud and/or be able to locally interact with apps of users of non-lighting configuration systems such as facility managers.

Data-driven non-lighting applications running on the facility managers cellular phone and/or a non-lighting permanent GW, e.g. a permanent GW of an HVAC configuration system in form of a HVAC room controller LCD panel, may need to exchange data with the lighting configuration system. For example, security and/or safety application checking may be performed if there is someone detected in the building in the case of fire. Furthermore, access control and/or HVAC control may be provided using the cellular phone of the facility managers.

The first configuration system, in this embodiment, the lighting configuration system, forms a backbone for the wireless network devices of other configuration systems to be added later to the wireless network, once it is installed and configured.

Using the ephemeral GW for pre-establishing the to be added configuration system allows to easily merge the wireless network devices of the configuration systems into one wireless network. The ephemeral GW of the to be added configuration system can learn configuration information from the lighting configuration system, e.g., by providing it from the cloud or by the ephemeral GW joining the wireless network of the lighting configuration system. The ephemeral GW can store the configuration information and use it when configuring the wireless network devices of the to be added configuration system. For example, the ephemeral GW can use the same network parameters as the wireless network of the lighting configuration system when configuring the wireless network devices of the to be added configuration system but modify one setting, such that the wireless network devices of the to be added configuration system can temporarily operate without interference with the wireless network devices of the lighting configuration system. For example, NWK key and EPID can be used of the wireless network of the lighting configuration system and PANID and/or network channel can be modified. Additionally, for example, nwkUpdateID can be decremented, thus pretending these are old network settings. Furthermore, the IEEE addresses and the TCLKs of the wireless network devices of the to be added configuration system are supplied to the wireless network devices and permanent GW of the wireless network, e.g., via the cloud.

This may allow to avoid the need of the installer of the lighting configuration system to return for merging the configuration systems and/or that the lighting configuration system includes additional wireless network devices for extending it. Furthermore, validation of functionality of wireless network devices in the merged wireless network can be easily performed. Finally, ad-hoc modifications of the to be added configuration system that may influence the lighting configuration system are possible as the wireless network devices of the lighting configuration system can be easily reconfigured using the ephemeral GW.

In yet another embodiment, the ephemeral GW during configuring provides network parameters to the wireless network devices of the to be added configuration system. The wireless network devices start silently operating on the wireless network using the network parameters. The silent start means, that the wireless network devices do not perform a scan, and thus do not detect the wireless network devices of the lighting configuration system. That allows the installer to configure the wireless network devices of the to be added configuration system as they are used to. The installer can also test their functionality independently and free of any interaction with the lighting configuration system. After validating the functionality, a re-join command sent to the wireless network devices of the to be added configuration system causes them to find the wireless network devices of the lighting configuration system. This results in updating the network parameters and merging the wireless network devices of the configuration systems into one wireless network.

In a tenth embodiment, an ephemeral GW is used for performing an initial software update of a software of the wireless network devices during configuration of the wireless network devices. Wireless network devices may be installed and configured after having spent multiple months on a shelf. The ephemeral GW can be configured for installing initial updates reliably and quickly using OTAU.

Specifically, a duration of the OTAU is critical. In this embodiment, OTAU is performed while an installer is busy with mechanically installing other wireless network devices, e.g., luminaires or when he is taking a break. This allows avoiding the risk that the OTAU is performed while a wireless network device is joined to the wireless network.

In other embodiments, one or more wireless network devices can act as OTAU servers. The OTAU servers can be provided with software updates from the ephemeral GW. The OTAU servers can then provide the software updates to the other wireless network devices. This allows to perform updating quietly while the installer is working or even after the installer is gone. It is also possible to broadcast the software update in an "OTAU broadcast" as typically many or all of the wireless network devices need the same software updates if they are identical or similar devices.

In yet another embodiment, wireless network devices include a power source, such as a battery. This can be utilized for performing OTAU while the wireless network devices are still in a box before they are installed. The wireless network devices may also be partly configured while in the box.

In yet another embodiment, a configuration system in form of an HVAC system is utilized. A permanent GW may not be installed yet or be disabled and an ephemeral GW may be included in the HVAC system for configuring wireless network devices in form of HVAC devices, such as heating devices, air conditioning devices and cooling devices. An installer may check if a cloud backend of the HVAC system correctly displays in a user interface an occupancy status of a room on a floorplan. This can allow validating several configuration aspects while being on a site where the wireless network is configured. This can ensure that a tricky integration with a HVAC system is working as intended.

Figure 5:
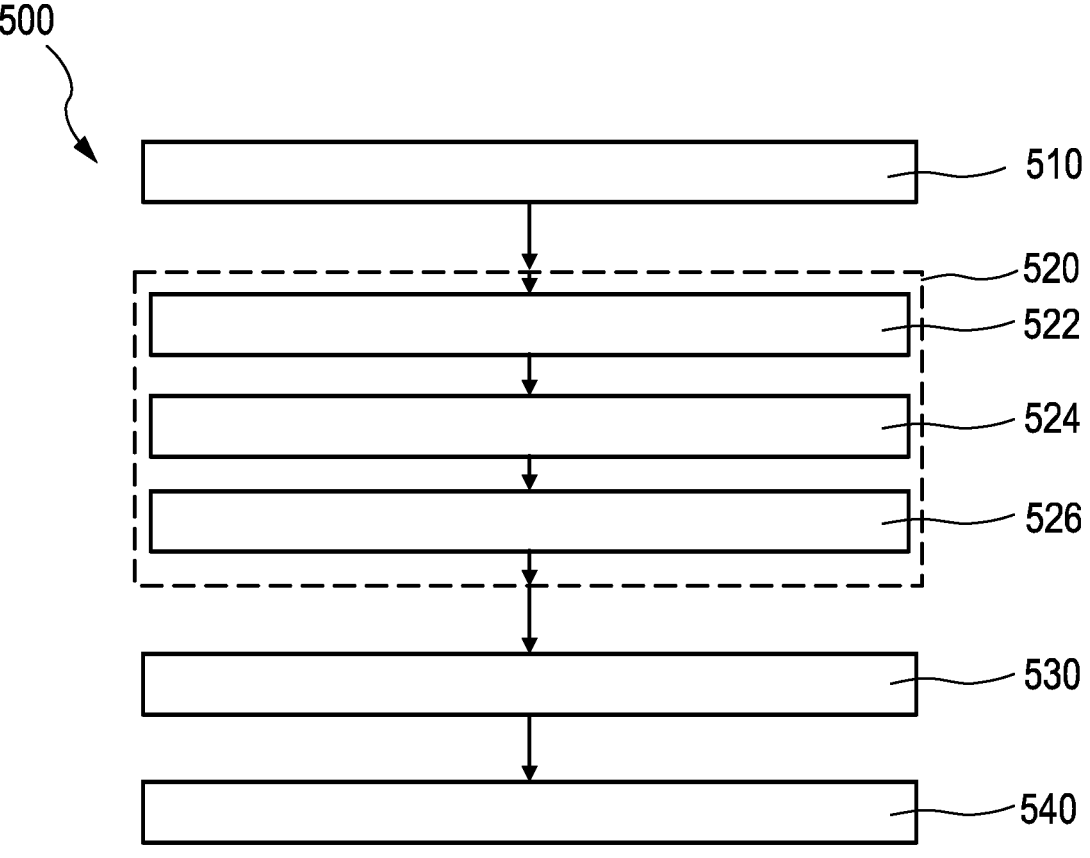
FIG. 5 shows an exemplary flow diagram of an embodiment of a method for configuring wireless network devices and a permanent GW.

FIG. 5 shows an exemplarily flow diagram of an embodiment of a method 500 for configuring a set of wireless network devices and at least one other GW using a mobile configuration device. The at least one other GW is a permanent GW in this embodiment, e.g., a bridge. In other embodiments, the other GW may also be another ephemeral GW, e.g., provided by another mobile configuration device. The method can be used, for instance, in the configuration system 100 of FIGS. 2 and 3 by the cellular phone 10 of FIG. 1 for configuring the wireless network devices 40, 42, and 44 and the permanent GW 30 of the wireless network 200 of FIGS. 2 to 4.

In step 510, an ephemeral GW 12 located at a current position of the cellular phone 10 is provided by the cellular phone 10.

In step 520, the ephemeral GW 12 configures the wireless network devices 40, 42, and 44 that are in proximity of the cellular phone 10. In this embodiment, the wireless network devices 40, 42, and 44 which are in single-hop distance to the cellular phone 10 and therefore to the ephemeral GW 12 are configured. In this embodiment, the configuring includes the sub steps 522, 524, and 526. The sub steps 522, 524, and 526 may be performed for each of the wireless network devices 40, 42, and 44 one-by-one, i.e., performing sub steps 522, 524, and 526 for one of the wireless network devices 40, 42, and 44 and afterwards performing them for another one of the wireless network devices 40, 42, and 44. Alternatively, the sub steps 522, 524, and 526 may also be performed in parallel, i.e., first performing sub step 522 for all wireless network devices 40, 42, and 44, then performing sub step 524 for all of them, and finally performing sub step 526 for all of them.

In sub step 522, the ephemeral GW 12 creates a wireless connection 24 to the wireless network devices 40, 42, and 44.

In sub step 524, the ephemeral GW 12 uses the wireless connection 24 to wirelessly communicate with and to provide network parameters for the wireless network 200 to the wireless network devices 40, 42, and 44. The network parameters include security related information comprising TCLKs for the wireless network devices 40, 42, and 44. Each TCLK for a respective one of the wireless network devices 40, 42, and 44 is unique. The network parameters furthermore include address information of the ephemeral GW 12.

In sub step 526 the network parameters are included in a configuration information.

In step 530, the ephemeral GW 12 acts as a GW of the wireless network 200.

In step 540, the ephemeral GW 12 makes available for the permanent GW 30 the configuration information of the wireless network 200 obtained during configuring the wireless network devices 40, 42, and 44. Therefore, the configuration information is stored by the ephemeral GW 12 in memory 16. In other embodiments, the configuration information may also be stored on a server, such as a cloud server that can provide it to the permanent GW 30 even when the ephemeral GW 12 is gone. In this embodiment, the ephemeral GW 12 directly provides the configuration information to the permanent GW 30. This allows replacing or augmenting the ephemeral GW 12 by the permanent GW 30. The permanent GW 30 can then control the wireless network 200 or perform functions to augment the ephemeral GW 12.

In other embodiments, more than one ephemeral GW and more than one permanent GW may participate in the method.

In other embodiments, the method may furthermore include a step in which a functionality of the at least one other GW is adjusted by the ephemeral GW or ephemeral GWs. Adjusting the functionality of the at least one other GW can for example include disabling the at least one other GW, silencing it, reducing its functionality or changing its functionality. In further embodiments, the method can include one or more of the steps: grouping the wireless network devices, optimizing the wireless network, provisioning controls behavior of the wireless network devices in the wireless network, validating the controls behavior of the wireless network devices in the wireless network, providing network parameters to the wireless network devices, setting configuration parameters of the wireless network devices, providing software updates for software of the wireless network devices, and determining status information of the wireless network devices.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein the configuration system includes one or more subsystems, such as an office space configuration system, a lighting configuration system, a HVAC configuration system, a home security monitoring system or parking garage configuration system. The configuration system can for example also include a smart metering system or a plug-load controller system for a machinery, e.g., an electricity plug load controller system for machinery. The ephemeral GW can for example be used for configuring the wireless network devices of a second subsystem, e.g., an electricity plug load controller system for machinery, after the first subsystem, e.g., a lighting configuration system, is already operating.

Other variations to the disclosed embodiments can be understood and effected by those skilled in the art in practicing the claimed invention, from a study of the drawings, the disclosure, and the appended claims.

In the claims, the word "comprising" and "including" does not exclude other elements or steps, and the indefinite article "a" or "an" does not exclude a plurality.

A single unit, processor, or device may fulfill the functions of several items recited in the claims. The mere fact that certain measures are recited in mutually different dependent claims does not indicate that a combination of these measures cannot be used to advantage.

Operations like providing an ephemeral GW located at a current position of the mobile configuration device, providing an ephemeral GW located at a current position of the mobile configuration device, the ephemeral GW configuring wireless network devices of the set of wireless network devices which are in proximity of the mobile configuration device, the ephemeral GW acting as a GW of the wireless network, and the ephemeral GW making available for the at least one other GW configuration information of the wireless network obtained during configuring the wireless network devices, the ephemeral GW creating a wireless connection to the wireless network devices, the ephemeral GW wirelessly communicating with and providing network parameters of the wireless network, security related information, and/or its address information to the wireless network devices, storing configuration information of the wireless network, joining of the wireless network devices into the wireless network, grouping the wireless network devices, optimizing the wireless network, provisioning controls behavior of the wireless network devices in the wireless network, validating the controls behavior of the wireless network devices in the wireless network, providing network parameters to the wireless network devices, setting configuration parameters of the wireless network devices, providing software updates for software of the wireless network devices, determining status information of the wireless network devices, et cetera performed by one or several units or devices can be performed by any other number of units or devices. These operations and/or the method can be implemented as program code means of a computer program and/or as dedicated hardware.

A computer program product may be stored/distributed on a suitable medium, such as an optical storage medium, or a solid-state medium, supplied together with or as part of other hardware, but may also be distributed in other forms, such as via the Internet, Ethernet, or other wired or wireless telecommunication systems.

Any reference signs in the claims should not be construed as limiting the scope.

The present invention relates to providing a mobile ephemeral GW. The ephemeral GW is configured for configuring wireless network devices of a wireless network in its proximity, for acting as a gateway of the wireless network, and for making available for at least one other gateway configuration information of the wireless network obtained during configuring the wireless network devices. The mobile ephemeral GW can be replaced or augmented by the at least one other GW. The wireless network can be controlled based on the configuration information made available by the ephemeral GW. This may allow a more reliable and faster configuration of wireless networks with reduced data traffic during configuration as well as an improved operation of the wireless network as multiple GWs may perform functions in the wireless network sequentially or in parallel.

The invention claimed is:

1. A mobile configuration device comprising:
a processor configured to provide an ephemeral gateway located at a current position of the mobile configuration device,
wherein the ephemeral gateway is configured to:
configure wireless network devices of a wireless network that are in proximity of the mobile configuration device,
act as a gateway of the wireless network,
make available for at least one other gateway configuration information of the wireless network obtained during configuring the wireless network devices,
provide security related information of the wireless network in the configuration information,
use at least Zigbee communication protocol for configuring the wireless network devices,
act as a temporary trust center that generates trust center link keys for the wireless network devices of the wireless network, and
make available for the at least one other gateway trust center link key information about the trust center link keys as security related information in the configuration information in order to allow the at least one other gateway to use the trust center link keys or to arrive at own trust center link keys based on the trust center link key information made available by the ephemeral gateway, and
wherein the ephemeral gateway is configured to configure the wireless network devices within a same zone or a single-hop distance of the current position of the mobile configuration device.

2. The mobile configuration device according to claims 1, wherein the ephemeral gateway is configured for at least temporarily adjusting a functionality of the at least one other gateway for the wireless network devices which are in the same zone or single-hop distance of the current position of the mobile configuration device if the at least one other gateway is included in the wireless network with the ephemeral gateway.

3. The mobile configuration device according to claim 1, wherein the ephemeral gateway is configured for making available for the at least one other gateway its address information in the configuration information in order to allow the at least one other gateway to replace or augment the ephemeral gateway in the wireless network.

4. The mobile configuration device according to claim 1, wherein the ephemeral gateway is configured for configuring the wireless network devices in multiple phases including one or more of:
a phase of joining of the wireless network devices into the wireless network,
a phase of grouping the wireless network devices,
a phase of optimizing the wireless network,
a phase of provisioning controls behavior of the wireless network devices in the wireless network,
a phase of validating the controls behavior of the wireless network devices in the wireless network.

5. The mobile configuration device according to claim 1, wherein the ephemeral gateway is configured for one or more of
providing network parameters to the wireless network devices, setting configuration parameters of the wireless network devices, providing software updates for software of the wireless network devices, determining status information of the wireless network devices.

6. A configuration system comprising:

one or more mobile configuration devices according to claim 1, at least one other gateway, and a set of wireless network devices of a wireless network, wherein the one or more mobile configuration devices are configured for providing one or more ephemeral gateways for configuring wireless network devices of the set of wireless network devices in their proximity and for acting as a gateway or gateways of the wireless network, and for making available for the at least one other gateway the configuration information of the wireless network obtained during configuring the wireless network devices.

7. The configuration system according to claim 6, wherein the one or more ephemeral gateways are configured for detecting wireless network devices of the set of wireless network devices and wherein one of the wireless network devices is a hub wireless network device configured for providing detection signals or for providing detection signals more frequently than other wireless network devices in order to allow the one or more ephemeral gateways to detect the hub wireless network device faster than other wireless network devices.

8. The configuration system according to claim 7, wherein the hub wireless network device is configured for storing history information of the one or more ephemeral gateways.

9. The configuration system according to claim 6, wherein the configuration system includes a sensor-based system configured for checking a status of at least one of the wireless network devices.

10. A method for configuring a set of wireless network devices and at least one other gateway of a wireless network using a mobile configuration device, the method comprising:

providing an ephemeral gateway located at a current position of the mobile configuration device, the ephemeral gateway configuring wireless network devices of the set of wireless network devices which are in proximity of the mobile configuration device, the ephemeral gateway acting as a gateway of the wireless network, and the ephemeral gateway making available for the at least one other gateway configuration information of the wireless network obtained during configuring the wireless network devices;

wherein the ephemeral gateway is configured for providing security related information of the wireless network in the configuration information;

wherein the ephemeral gateway is configured to:

use at least a Zigbee communication protocol for configuring the wireless network devices, act as a temporary trust center that generates trust center link keys for the wireless network devices of the wireless network, and make available for the at least one other gateway trust center link key information about the trust center link keys as security related information in the configuration information in order to allow the at least one other gateway to use the trust center link keys or to arrive at own trust center link keys based on the trust center link key information made available by the ephemeral gateway, and wherein the ephemeral gateway configures the wireless network devices within a same zone or a single-hop distance of the current position of the mobile configuration device.

11. A computer program product for configuring wireless network devices and at least one other gateway of a wireless network using a mobile configuration device, wherein the computer program product comprises program code means for causing a processor to carry out the method as defined in claim 10, when the computer program product is run on the processor.

12. A non-transitory computer readable medium comprising computer executable instructions that, when executed, perform at least the method of claim 10.

* * * * *